US007925216B2

(12) United States Patent
Casavant et al.

(10) Patent No.: US 7,925,216 B2
(45) Date of Patent: Apr. 12, 2011

(54) MOBILE RECEIVER SOLUTIONS FOR ACCESSING BROADBAND VIDEO-ON-DEMAND SERVICES

(75) Inventors: Scott D. Casavant, Germantown, MD (US); Jorge H. Guzman, Gaithersburg, MD (US); Sean S. Lee, Rockville, MD (US)

(73) Assignee: The DIRECTV Group, Inc., El Segundo, CA (US)

( * ) Notice: Subject to any disclaimer, the term of this patent is extended or adjusted under 35 U.S.C. 154(b) by 887 days.

(21) Appl. No.: 11/595,394

(22) Filed: Nov. 10, 2006

(65) Prior Publication Data
US 2008/0115180 A1  May 15, 2008

(51) Int. Cl.
*H04B 7/00* (2006.01)
(52) U.S. Cl. ............ 455/66.1; 725/39; 725/86; 725/100; 709/219; 714/18; 707/10; 370/312
(58) Field of Classification Search .................... 725/100
See application file for complete search history.

(56) References Cited

U.S. PATENT DOCUMENTS

| 6,118,976 | A * | 9/2000 | Arias et al. ..................... 725/118 |
| 6,259,891 | B1 | 7/2001 | Allen |
| 6,442,385 | B1 | 8/2002 | Marko |
| 2003/0186647 | A1 | 10/2003 | Ikeda |
| 2003/0216120 | A1 | 11/2003 | Ceresoli et al. |
| 2004/0153767 | A1* | 8/2004 | Dolgonos ....................... 714/18 |
| 2005/0009466 | A1 | 1/2005 | Kamdar et al. |
| 2005/0068915 | A1 | 3/2005 | Atad et al. |
| 2005/0124289 | A1 | 6/2005 | Coffin, III |
| 2005/0136975 | A1 | 6/2005 | Caspi et al. |
| 2005/0216941 | A1* | 9/2005 | Flanagan et al. ................ 725/88 |
| 2005/0282489 | A1 | 12/2005 | Kamdar et al. |
| 2006/0004948 | A1 | 1/2006 | Grace et al. |
| 2006/0075444 | A1* | 4/2006 | Dillen ........................... 725/100 |
| 2006/0107295 | A1* | 5/2006 | Margis et al. ................... 725/81 |
| 2006/0128418 | A1 | 6/2006 | Quelle et al. |
| 2006/0154687 | A1 | 7/2006 | McDowell et al. |
| 2006/0166739 | A1 | 7/2006 | Lin |
| 2006/0194535 | A1 | 8/2006 | Houldsworth et al. |
| 2006/0240811 | A1 | 10/2006 | De Luca |
| 2006/0285508 | A1* | 12/2006 | Vermola et al. ............... 370/312 |
| 2006/0294205 | A1* | 12/2006 | Aaltonen et al. ............. 709/219 |
| 2007/0155307 | A1* | 7/2007 | Ng et al. ...................... 455/3.01 |

FOREIGN PATENT DOCUMENTS

EP        1530339 A1   5/2005

(Continued)

OTHER PUBLICATIONS

Leonard David, "Stratospheric Platform Serves as Satellite", Jul. 24, 2002, http://www.space.com/missionlaunches/skytower_020724.html.*

(Continued)

*Primary Examiner* — Zhiyu Lu (57) ABSTRACT

A communication system (10) includes a controller (10, 160) for communicating a selection list to a wireless device (28, 36). The wireless device includes a user interface (280) for selecting a selection from a selection list (452). The wireless device generates a selection signal in response to selecting and wirelessly transmits the selection signal to the controller (100, 160). The controller (100, 160) wirelessly transmits content corresponding to the selection signal to the wireless device. The controller (100, 160) may be a business service controller or a local communications controller.

29 Claims, 5 Drawing Sheets

FOREIGN PATENT DOCUMENTS

| | | | |
|---|---|---|---|
| GB | 2387090 | A | 10/2003 |
| GB | 2407738 | | 5/2005 |
| WO | 0143364 | | 6/2001 |

OTHER PUBLICATIONS

Daimlerchrysler; "DaimlerChrysler IT Cruiser Telematics Concept"; Internet citation; retrieved from the internet: URL:http://java.sun.com/products/consumer-embedded/automotive/whitepapers/ITCruiser-Whitepaper.pdf; Jan. 2001; pp. 1-11; XP002271676.

International Search Report and Written Opinion dated May 16, 2008 in International counterpart Application No. PCT/US2007/023361 corresponding to U.S. Appl. No. 11/593,712, filed Nov. 7, 2006 by John Norin et al.

International Search Report and Written Opinion dated May 9, 2008 in International counterpart Application No. PCT/US2007/023355 corresponding to U.S. Appl. No. 11/593,710, filed Nov. 7, 2006 by John Norin et al.

International Search Report and Written Opinion dated Aug. 11, 2008 in International counterpart application No. PCT/US2007/023363 corresponding to U.S. Appl. No. 11/595,394, filed Nov. 10, 2006 by Scott Casavant et al.

* cited by examiner

MOBILE RECEIVER SOLUTIONS FOR ACCESSING BROADBAND VIDEO-ON-DEMAND SERVICES

TECHNICAL FIELD

The present disclosure relates generally to a mobile satellite receiving devices, and, more specifically, to a method and system to provide on-demand capabilities in a mobile receiving device.

BACKGROUND

Satellite television has become increasingly popular due to its wide variety of programming. Entertainment in automobiles such as DVD players has also become increasingly popular. It would be desirable to provide a satellite television system for a vehicle so that the wide variety of programming may be enjoyed by the rear passengers.

Typical satellite systems include a receiving device that is used to receive satellite signals from the satellites and convert them to a usable format for playback on a television or monitor. In conventional home-based systems a telephone wire is coupled to the satellite receiving device to provide a return path back to the business controller. Mobile receiving devices are not connected to a hard-wired line due to mobility and thus the full functionality of a home-based system, as well as the business opportunity, may be lost in a mobile function.

It would therefore be desirable to provide a system and method for increasing the functions of a mobile receiving device.

SUMMARY

One feature of the disclosure sets forth a communication system that includes a controller wirelessly communicating a selection list to a wireless device and a mobile receiving device having a user interface for selecting from the selection list. The mobile receiving device generates a selection signal in response to selecting and wirelessly transmits the selection signal to the controller. The controller wirelessly transmits content corresponding to the selection signal to the mobile receiving device.

In another aspect of the disclosure, a method of operating a communication system includes wirelessly communicating a selection list to a wireless device, selecting from the selection list, generating a selection signal in response to selecting, wirelessly transmitting the selection signal to a controller, wirelessly transmitting content from the controller and receiving the content at the mobile receiving device.

In yet another aspect of the disclosure, a method of operating a mobile receiving device includes receiving a list of content from a controller, selecting a selection from the list at the mobile receiving device, communicating the selection to the controller, receiving content corresponding to the selection to the mobile receiving device and playing back the content using the mobile receiving device.

In a further aspect of this disclosure, a method of operating a communication system includes communicating content to a server from a business controller, communicating a list of content to a mobile receiving device, receiving a selection from the list at the server from the mobile receiving device and transmitting content corresponding to the selection to the mobile receiving device.

Other advantages and features of the present invention will become apparent when viewed in light of the detailed description of the preferred embodiment when take in conjunction with the attached drawings and appended claims.

DETAILED DESCRIPTION

In the following figures the same reference numerals will be used for the same components. The following figures are described with respect to a mobile satellite television system. However, those skilled in the art will recognize the teachings of the present invention may be applied to various types of mobile reception including land-based type systems. The present invention may be implemented using various types of electronic devices and various types of electronic content. Thus, the present invention not only relates to mobile satellite television receiving devices, but to non-mobile applications and other electronic devices Referring now to FIG. 1, a satellite television broadcasting system 10 is illustrated. The satellite television broadcasting system 10 includes a network operations center 12 that generates wireless signals through a transmitting antenna 14 which are received by a receiving antenna 16 of a satellite 18. A stratospheric platform 19 may also be used in place of a satellite 18. A stratospheric platform is positioned between 60,000-100,000 feet above the Earth and may include an airplane, balloon, dirigible or the like. The stratospheric platform 19 may also be used to provide or establish a wireless network in place of or in addition to the networks set forth below. The wireless signals, for example, may be digital. A transmitting antenna 20 generates signals directed to various receiving systems including stationary systems such as those in the home as well as mobile receiving systems 22. The wireless signals may have various types of information associated with them including location information. The wireless signals may also have various video and audio information associated therewith. As illustrated, the mobile receiving system 22 is disposed within an automotive vehicle 24. A mobile receiving antenna 26 receives the wireless signals from the satellite 18 and processes the signals in a mobile receiving unit 28. The mobile receiving unit 28 may be similar a set top box or an integrated receiver decoder and will be further described below. The mobile receiving unit 28 may also include a separate antenna 30 and a receiver 32 for receiving various content from a terrestrial wireless network such as a WiFi, WiMax, RF Bluetooth, cellular, EVDO, wireless LAN, and the like, as will be described below. The wireless signals may be broadcast by the NOC 12 through a wireless network antenna 13.

Figure 1:
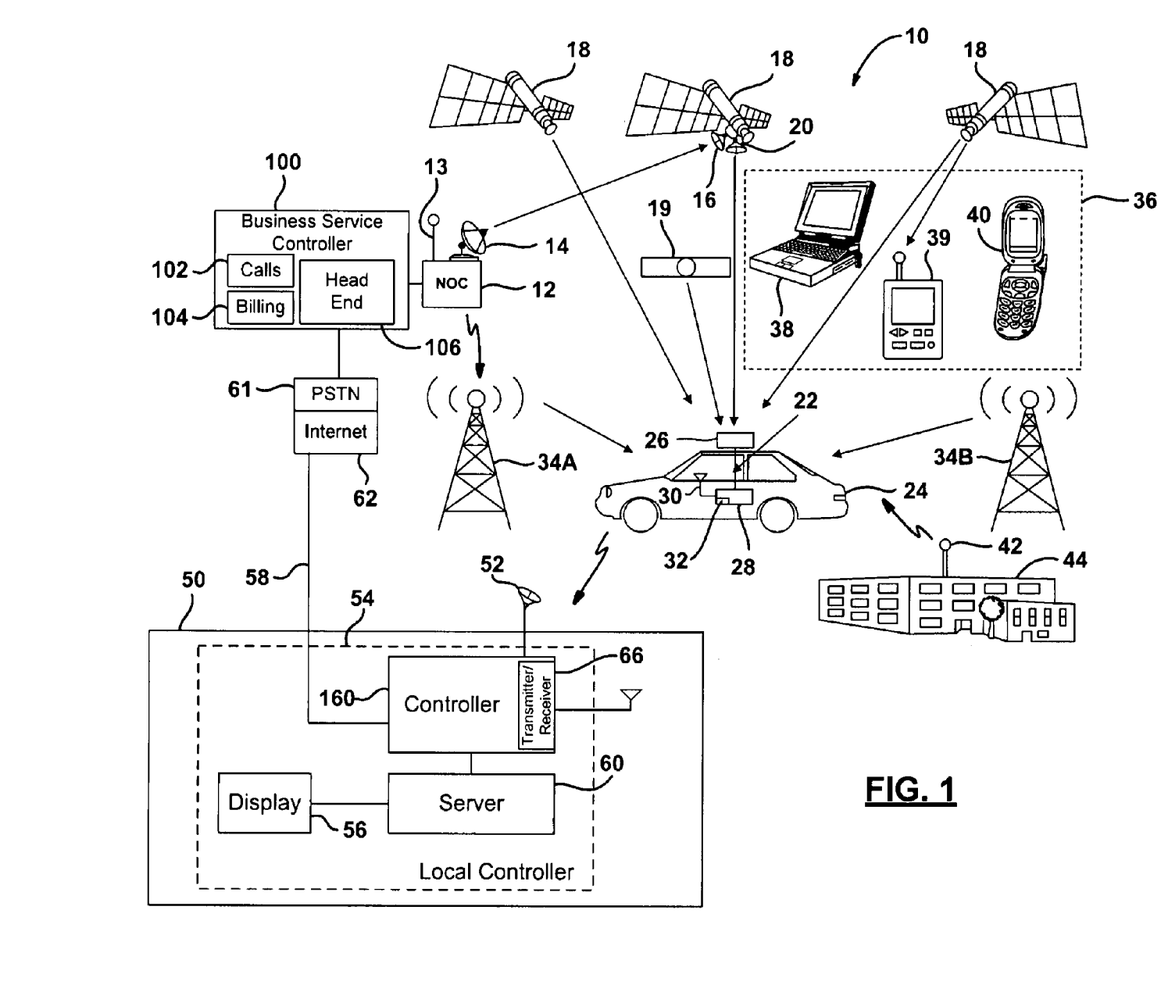
FIG. 1 is a system level view of a satellite broadcasting system according to the present disclosure.

The system may also be used for displaying various wireless information on a personal mobile device 36 such as a dedicated satellite television device or a laptop computer 38, a personal digital assistant 39, and a cellular telephone 40. It should be noted that these devices and the automotive-based devices may also receive wireless signals having various types of information associated therewith from the cellular towers 34A and 34B. Other types of information may be wirelessly broadcast from various other types of broadcasting areas such as an antenna 42 on a building 44. The building 44 represents various types of buildings such as a store, a central office at an RV park or campground, a hotel and the wireless information transmitted from the antenna 42 may be advertising information, lists for on-demand applications and on demand content. WiMax, WiFi, cellular, EVDO, wireless LAN and RF are examples of suitable protocols. Security features such as coded signals and passwords may be used to prevent unauthorized reception.

A building 50 is illustrated having a fixed antenna 52. The fixed antenna 52 is coupled to a local controller 54. The local controller 54 receives the satellite signals through the antenna 52 and converts them into audio and video files to be played on display 56 or transmitted by wireless means to a mobile receiving device. The receiving unit may include a server 60 coupled to a controller 160. Oftentimes, the local controller 54 may be coupled to a communication line 58 which in turn is coupled to the public service telephone network 60 or be coupled to the Internet 62 in a wired connection. The communication line 58 may be used to provide a means to place call-backs through a return path from the local controller 54. The local controller 54 may also include a transmitter receiver 66 that is used to communicate with a mobile device 22, 36. As will be described below, signals including content and lists may be transferred through the transmitter 66 to the mobile receiving unit 28. The transmitter receiver 66 may be an RF, Bluetooth, WiFi, WiMax or WiMax mobile transmitter. It should be noted that the transmitter 66 may be a wireless or wired connection to the portable device 68.

As is mentioned above, the local controller 54 may be coupled to a communication line 58. This allows another method for file transfers, call-backs, call-in signals lists, on-demand content, and the like, such as from the local controller 54 to the receiving device 28 and vice versa.

The server 60 may also be coupled to the communication line 58. In this example, the line may also be a cable wire. By coupling the server 60 to the local controller 54, various actions may be controlled such as a signal or file transfer from the server 60 to the mobile receiving device 28 through a particular protocol or network such as a WiFi network or other wireless network through antenna 52. Various frequencies and access protocols may be used in the wireless network.

A central location such as a business service controller 100 may be coupled to the public service telephone network (PSTN) 61. The business service controller 100 is typically used in a DirecTV-type system for billing, pay-per-view, interactive programming and on-demand, services. The business service controller 100 may receive calls 102 and provide billing services 104. The business service controller 100 may also act as a head end 106 coupled to network operation center 12.

The business service controller 100 may generate on-demand selection lists of contents available from the business center.

If content such as on-demand content is stored on server 60, the controller 160 may cause the list to be transferred to mobile devices within the network. The controller 160 may also cause lists received from the business controller to be transferred to mobile users within range of the wireless network. On-demand content may also be transferred in the same way.

Figure 2:
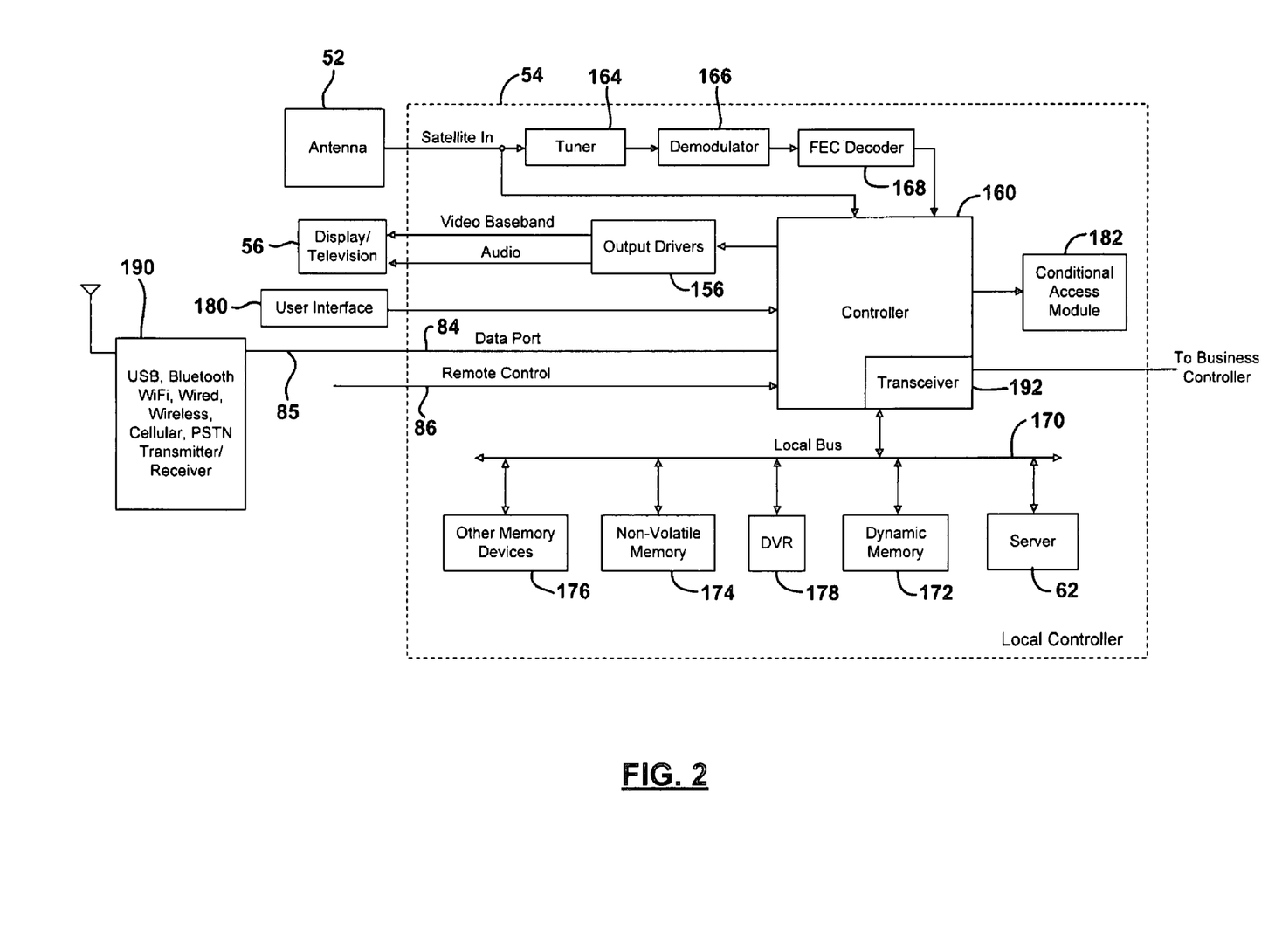
FIG. 2 is a block diagrammatic view of a local controller according to the present disclosure.

Referring now to FIG. 2, a local controller 54 is illustrated in further detail. Although a particular configuration of the local controller 54 is illustrated, it is merely representative of various electronic devices with internal controllers that may be used as a receiving or transmitting device. Antenna 52 may be various types of antennas having various numbers of low noise blocks. The antenna 52 may be a single antenna used for satellite television reception. The antenna 52 may also be an electronic antenna separate or integral with the device.

A display 56 such as a television may be coupled to or in communication with the local controller 54. The display 56 may include output drivers 156 used for generating the desired audio and video outputs suitable for the particular display 56.

The controller 160 may be a general processor such as a microprocessor. The controller 160 may be used to coordinate and control the various functions of the local control module. These functions may include a tuner 164, a demodulator 166, a forward error correction decoder 168 and any buffers and other functions. The tuner 164 receives the signal or data from the individual channel. The demodulator 166 demodulates the signal or data to form a demodulated signal or data. The decoder 168 decodes the demodulated signal to form decoded data or a decoded signal. The controller 160 may be similar to that found in current DirecTV set top boxes which employ a chip-based multifunctional controller.

The input from the antenna may also be coupled directly to the controller 160 for storage on the server 60 with minimal processing. In this case, the local controller 54 acts as a rebroadcasting medium.

The controller 160 may include or be coupled to a local bus 170. The local bus 170 may be used to couple a dynamic memory 172 such as RAM which changes often and whose contents may be lost upon the interruption of power or boot up. The bus 170 may also be coupled to a non-volatile memory 174. The non-volatile memory may be an in-circuit programmable type memory. One example of a non-volatile memory is an EEPROM. One specific type of EEPROM is flash memory. Flash memory is suitable since it is sectored into blocks of data segments that may be individually erased and rewritten.

Other memory devices 176 may also be coupled to local bus 170. The other memory devices may include other types of dynamic memory, non-volatile memory, or may include such devices such as a digital video recorder (DVR) 178 and the server 60. The display 56 may be changed under the control of controller 60 in response to the data in the dynamic memory 172 or non-volatile memory 174. The DVR 178 and server 60 may store various audio and video files to be transferred.

The controller 160 may also be coupled to a user interface 180. User interface 180 may be various types of user interfaces such as a keyboard, push buttons, a touch screen, a voice activated interface, or the like. User interface 180 may be used to select a channel, select various information, change the volume, change the display appearance, or other functions. The user interface 180 is illustrated as part of the mobile receiving unit. However, should the unit be incorporated into a vehicle, the user interface 180 may be located external to the mobile receiving unit such as dial buttons, voice activated system, or the like incorporated into the vehicle and interface with the mobile receiving unit.

A conditional access module 182 (CAM) may also be incorporated into the local controller 54. Access cards such as a conditional access module (CAM) cards are typically found in DirecTV units. The access module 82 may provide conditional access to various channels and wireless signals generated by the system. Not having an access card or not having an up-to-date access card 182 may prevent the user from receiving or displaying various wireless content from the system.

FIG. 2 also shows an interface 190. The interface 190 may be external to the local controller 54, internal to the local controller 54, or incorporated as part of the controller 160. The interface 190 may include the functions of the transmitter 66 illustrated in FIG. 1. The interface 190 is used to communicate files stored within the memory or server of local controller 54 to the mobile receiver 28. This may be done directly through a WiFi, WiMax, WiMax mobile, wireless, cellular or other communication directly to the mobile receiver 28.

A transceiver 192 may be included in local controller 54 separately or as part of controller 160 (as illustrated). The transceiver 192 is used to communicate with the business controller 100 through the communication line 58 and the PSTN 60, internet 62, or the like.

Figure 3:
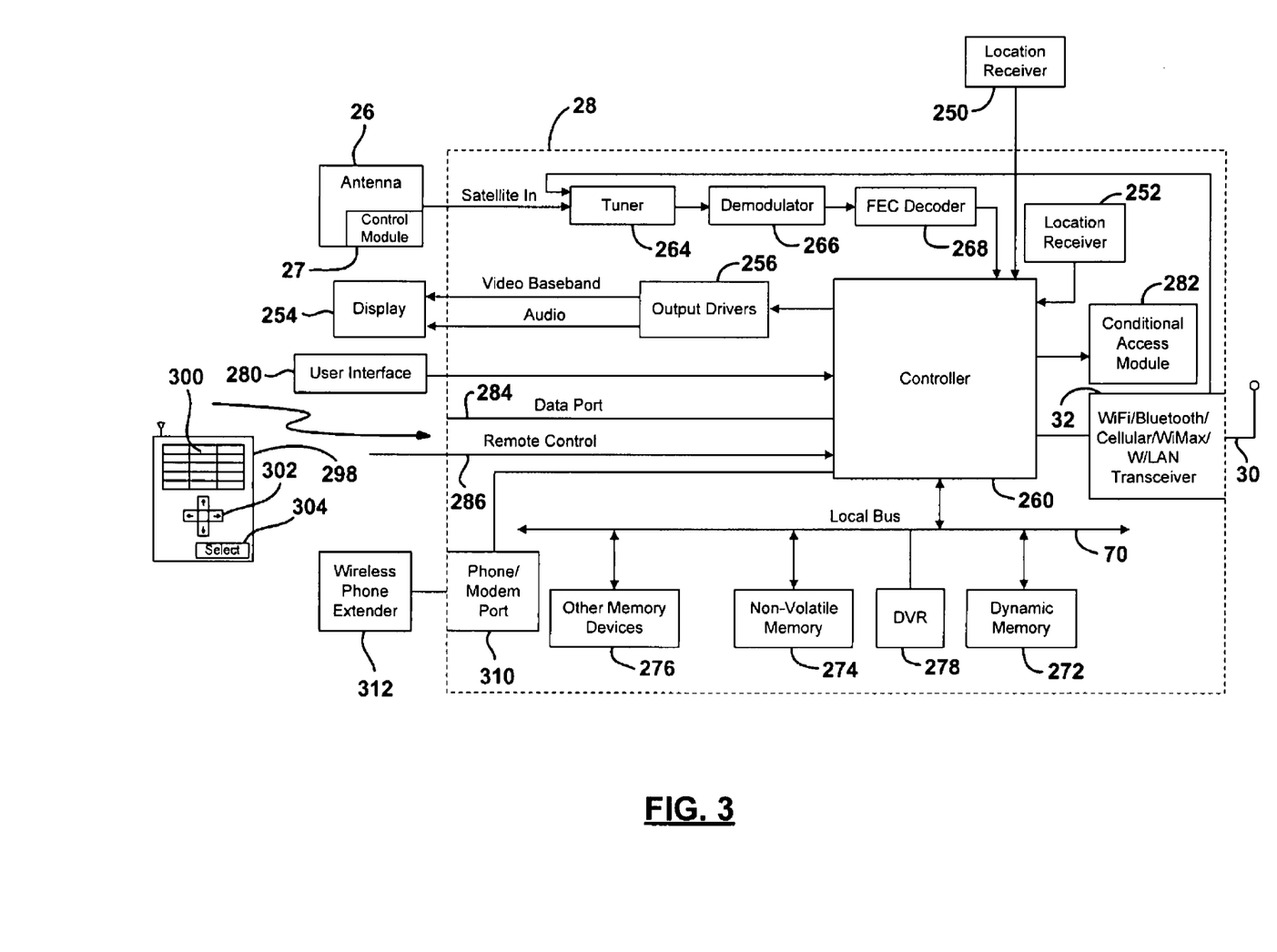
FIG. 3 is a block diagrammatic view of a mobile receiving system according to the present disclosure.

Referring now to FIG. 3, the receiving unit 28 is illustrated in further detail. Although the receiving unit 28 is illustrated, or is merely representative of various electronic devices with internal controllers. Antenna 26 may be various types of antennas including a rotating antenna which is used to track the relative movement of the satellite or other transponding device with respect to the vehicle. The antenna 26 may be a single antenna used for satellite television reception, or a number of antennas such as one for receiving television signals and one coupled to a location receiver 250 such as GPS receiver. The antenna 26 may also be an electronic antenna such as a phased array or a panel antenna. The antenna 26 may include an internal controller 27 that controls the operation of the antenna 26.

The mobile receiver unit 28 may be coupled to antenna 26 with a two-way communication channel such as a wire or a wireless system. The mobile receiving unit 28 may also include a location receiver 252 integrated therein. The location receiver 252 may be a GPS receiver. In a preferred embodiment, only one location receiver 250, 252 may be provided in the system. However, the location receiver 250, 252 may be part of the vehicle 24 or may be part of the mobile receiving system 22, 36. The controller 260 may be coupled directly to location receiver 252 and/or location receiver 250. The mobile receiving unit 28 includes a display 254. The display 254 may be incorporated into the device 28 or within the vehicle 24. The display 254 or the mobile receiving unit 28 may include output drivers 256 used for generating the desired audio and video outputs suitable for the particular display 254.

A controller 260 may be a general processor such as a microprocessor. The controller 260 may be used to coordinate and control the various functions of the receiving unit 28. These functions may include a tuner 264, a demodulator 266, a forward error correction decoder 268 and any buffers and other functions. The tuner 264 receives the signal or data from the individual channel. The demodulator 266 demodulates the signal or data to form a demodulated signal or data. The decoder 268 decodes the demodulated signal to form decoded data or a decoded signal. The controller 260 may be similar to that found in current DirecTV set top boxes that employ a chip-based multifunctional controller.

The controller 260 may include or be coupled to a local bus 270. The local bus 270 may be used to couple a dynamic memory 272 such as RAM that changes often and whose contents may be lost upon the interruption of power or boot up. The bus 270 may also be coupled to a non-volatile memory 274. The non-volatile memory may be an in-circuit programmable type memory. One example of a non-volatile memory is an EEPROM. One specific type of EEPROM is flash memory. Flash memory is suitable since it is sectored into blocks of data segments that may be individually erased and rewritten.

Other memory devices 276 may also be coupled to local bus 270. The other memory devices may include other types of dynamic memory, non-volatile memory, or may include such devices such as a digital video recorder 278. The display 254 may be changed under the control of controller 260 in response to the data in the dynamic memory 272, non-volatile memory 274 or memory 278.

The controller 260 may also be coupled to a user interface 280. User interface 280 may be various types of user interfaces such as a keyboard, push buttons, a touch screen, a voice activated interface, or the like. User interface 280 may be used to select a channel, select various information, change the volume, change the display appearance, or other functions. The user interface 280 is illustrated as part of the mobile receiving unit. However, should the unit be incorporated into a vehicle, the user interface 280 may be located external to the mobile receiving unit such as dial buttons, voice activated system, or the like incorporated into the vehicle and interface with the mobile receiving unit.

One example of a user interface 280 is a remote control device 298 having a key pad 300, an arrow key pad 302, and a select button 304. Inputs to the receiver 28 may be provided by the remote control device 298 or through another type of user interface 280.

A conditional access module or card 282 (CAM) may also be incorporated into the mobile receiving unit. Access cards such as a conditional access module (CAM) cards are typically found in DirecTV units. The access card 282 may provide conditional access to various channels and wireless signals generated by the system. Not having an access card or not having an up-to-date access card may prevent the user from receiving or displaying various wireless content from the system. The conditional access card may require a conditional access signal periodically to allow the satellite signals to be used or played back.

The controller 260 may be coupled to a data port 284 that is used to send or receive data and a remote control input 286 for receiving data from a wired or wireless remote control device.

The controller 260 may be coupled to a wireless or wired modem port 310. The wireless or wired phone/modem port may be coupled to a wireless phone extender 312. The wireless phone extender 312 is used to communicate with the interface 190 in the home-based local controller 54.

The controller 260 may also be coupled to an interface 32 that may include the antenna 30. The interface 32 may include a WiFi, WiMax, Bluetooth, cellular, wireless LAN, or the like. Signals and files received through the interface 32 may be stored on the DVR 278 or memory for eventual playback and display on the display 254. The interface 32 may be coupled to the tuner input so the signals can be processed if unprocessed signals are received. As will be described below, the antenna 30 and interface 32 may be used to communicate with the local controller 54 over the wireless network. The interface 32 and antenna 30 may receive a list of available on-demand content on the server 60 or from the business controller 100. The antenna 30 and interface 32 may then be used to receive the content while the controller 160 plays back immediately (streaming) or stores the content for later playback. Playback may be performed while the stored content is being received.

Figure 4:
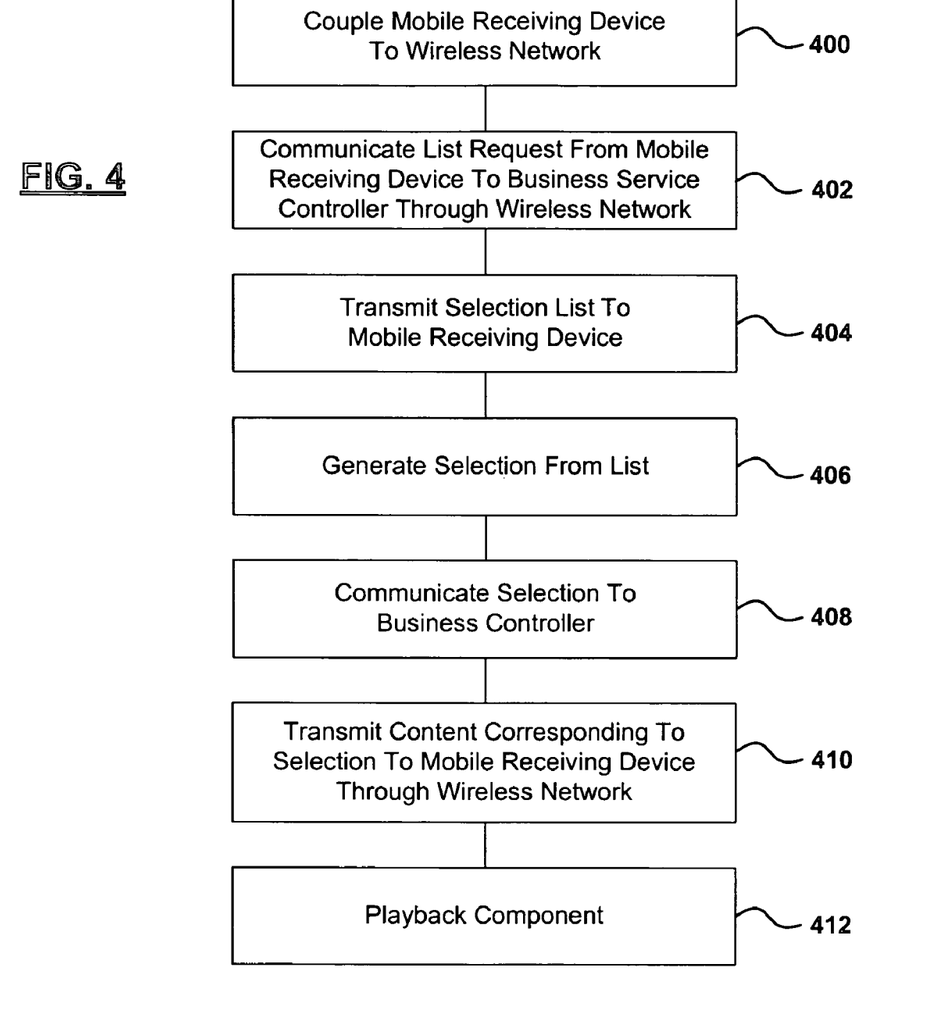
FIG. 4 is a flow chart illustrating one method for operating the present disclosure.

Referring now to FIG. 4, one embodiment of a method for operating the system is illustrated. In step 400, the mobile receiving device is coupled to a wireless network. As mentioned above, a transceiver 32 coupled to antenna 30 illustrated in FIG. 3 may be used in connection with the controller 160 and the transmitter receiver 190 of FIG. 2. Security or access codes may be used to secure the network.

In step 402, a list request is communicated from the mobile receiving device to the business service controller. This may be performed via the local controller 54 of FIG. 2.

In step 404, the selection list is transmitted from the business service controller to the mobile receiving device. As indicated above, the selection list may be transmitted in various manners including through a wireless network via local controller 54 or through the satellite wireless network. The selection list may be transmitted wirelessly by a cellular-type system, WiMax system, a WiFi system such as a local WiFi system or a city or region-wide WiFi system, or the like.

In step 406, a selection is chosen or selected from the selection list at the mobile receiving device 28. As will be described below in FIG. 5, the list may be displayed on the screen display and cursor movement or other selection device may be used to provide or capture the selection and initiate its transmission. In step 408, the selection is communicated to the business controller. The communication means may be one of the means described immediately above. In one example, the selected content is transmitted through the local controller 54 of FIG. 2. In step 410, the [selected] content corresponding to the selection is transmitted to the mobile receiving device. The selected content may be transmitted using the various wireless networks described above. In step 412, the selected content is played back in the mobile receiving device. It should be noted that playback may take the place after the entire content or part thereof has been stored at the mobile receiving device. The mobile receiving device may also have the content streamed thereto and played as received.

Figure 5:
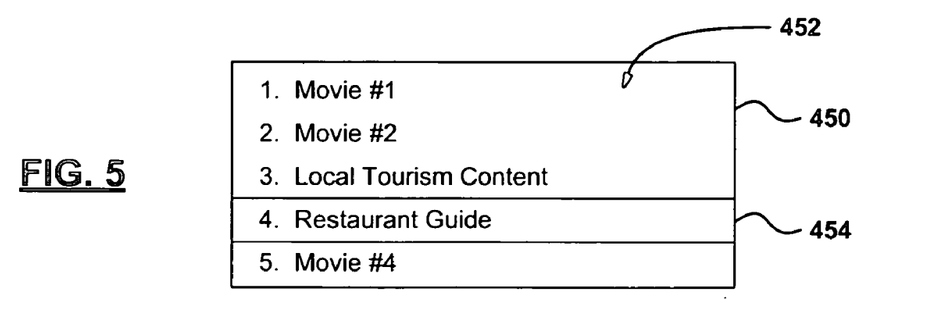
FIG. 5 is a screen display illustrating selections.

Referring now to FIG. 5, one example of a display 450 having several selections 452 is indicated thereon. The selections include movie 1, movie 2, a local tourism content selection, a restaurant guide selection, and a movie 4 selection. An indicator or cursor 454 is shown selecting the restaurant guide. In one example of the envisioned present disclosure, local information suitable for tourists may be provided as one selection. For example, a particular town or region may provide informational videos and the like while businesses may provide information suitable for tourism. These selections may be obtained free of charge or at a minimum cost. The selection may be performed using the remote control or various types of user interfaces.

Figure 6:
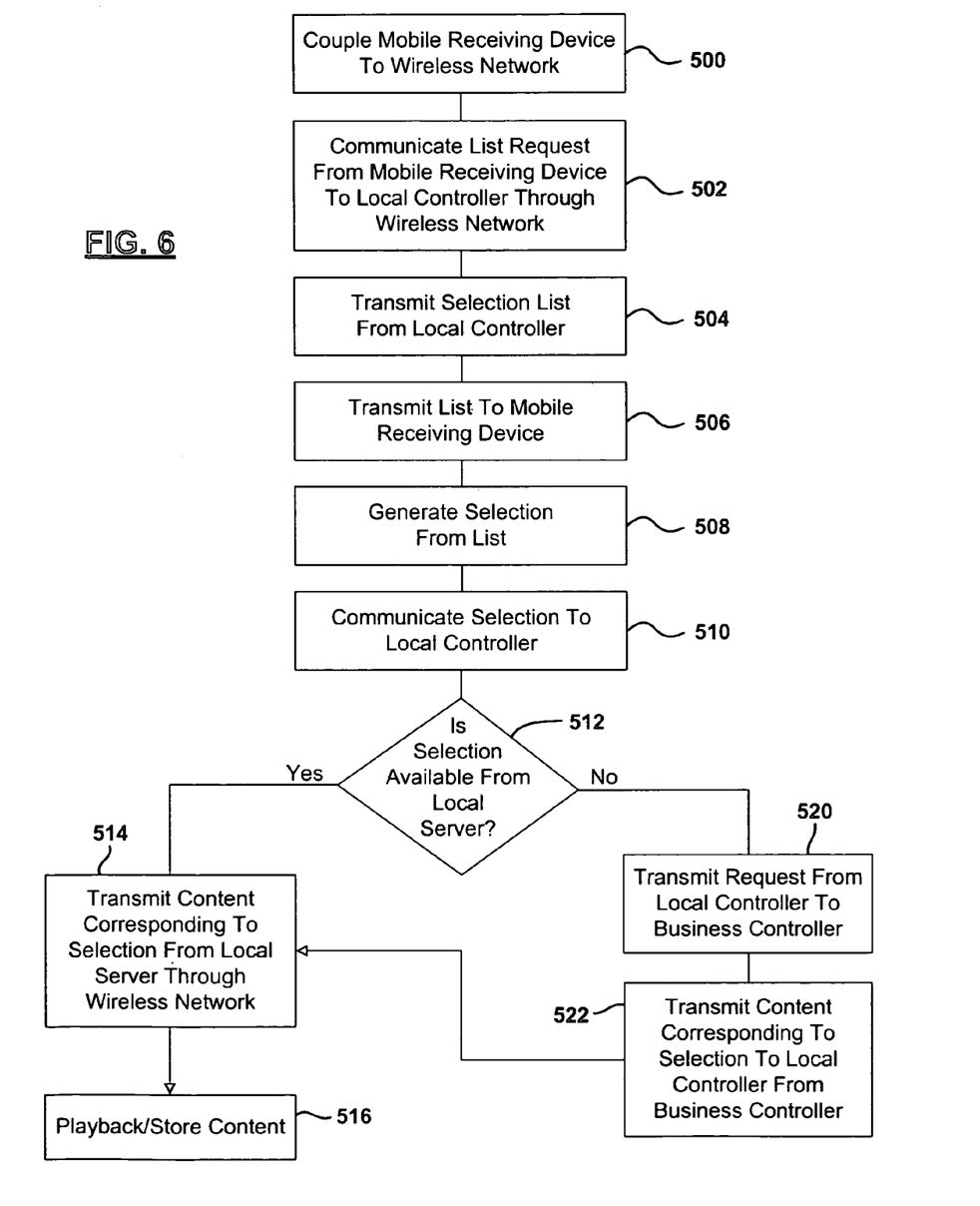
FIG. 6 is a flow chart illustrating a second method for operating the present disclosure.

Referring now to FIG. 6, in step 500 the mobile receiving device is coupled to a wireless network as described above. In step 502, a list request from the mobile receiving device is provided to the local controller through a wireless network. As mentioned above, various types of wireless networks are suitable for such communications. In step 504, the selection list may be transmitted from the local controller 54. The local controller 54 may obtain the selection list from the business center or may generate a selection list based upon the content stored within the server. The selection list may also be obtained from the business service controller. In step 506, the selection list is transmitted to the mobile receiving device. In step 508, a selection is selected from the selection list. The selection is communicated to the local controller in step 510. The various methods for communicating the list and the list selections may be similar to those set forth above with respect to claim 4.

In step 512, if the selection is available from the local server 60, step 514 is executed. In step 514, the content corresponding to the selection is transmitted from the local server 60 through the wireless network to the mobile receiving device. In step 516, the content is played back or stored by the mobile receiving device.

Referring back to step 512, if the selection is not available from the local server 60, a transmit request from the local controller to the business controller is provided in step 520. In step 522, a content corresponding to the selection is transmitted to the local controller from the business controller. After step 522, steps 514 and 516 are again performed in which the content is transmitted from the local server to the wireless network then stored or played back on the mobile device.

As can be appreciated by the above description, a system may be implemented in which on-demand content may be provided directly from and only from a local server. The local server may communicate with the business controller to obtain various content to offer through the on-demand system. This type of system may be suitable for hotels, camp grounds, libraries, or the like. Video stores may also benefit from the content. When the customer is within the range of the wireless local area network of the video store, content may be transferred to the device. Therefore, while in the proximity of a video store or other store that sells movies, content may be selected and downloaded onto the mobile receiving device. The service described above is in addition to the satellite television receiving performed by the mobile receiving device.

The local controller may also act as an intermediary. A list of contents may be provided from the business controller at various times or upon request from the local controller. The server in the local controller may act to serve various movies or other content stored thereon to the mobile receiving device. Should the mobile receiving device request a selection not on the local server, the local server may act as an intermediary and request that the business center provide the content thereto. The server then may store the content for later use by other customers requesting the same content. Thus, as can be appreciated, various configurations in accordance with the present disclosure are possible.

While particular embodiments of the invention have been shown and described, numerous variations and alternate embodiments will occur to those skilled in the art. Accordingly, it is intended that the invention be limited only in terms of the appended claims.

What is claimed is:

1. A communication system comprising:
   a local controller wirelessly communicating a first portion of a selection list to a wireless mobile receiving device through a local network, said first portion corresponding to content available from the local controller;
   a business controller remotely located from the local controller and wirelessly communicating a second portion of the selection list to the wireless device, said second portion corresponding to content available from the business controller; and
   the mobile receiving device having a user interface for selecting from the selection list, the mobile receiving device generating a selection signal in response to selecting and wirelessly transmitting the selection signal to the local controller,
   the local controller wirelessly transmitting content corresponding to the selection signal to the mobile receiving device when the selection signal corresponds to the first portion and transmitting the selection signal to the business controller when the selection signal corresponds to the second portion, and
   the business controller communicating content directly to the mobile receiving device outside of the local network.

2. A communication system as recited in claim 1 wherein the mobile receiving device comprises a satellite receiver and a wireless network receiver.

3. A communication system as recited in claim 1 wherein the selection list is received on the wireless network receiver.

4. A communication system as recited in claim 1 wherein the selection list is received on the satellite receiver.

5. A communication system as recited in claim 1 wherein the mobile receiving device comprises a wireless network transmitter communicating the list selection to the local controller.

6. A communication system as recited in claim 1 wherein the local network comprises a WiFi network.

7. A communication system as recited in claim 1 wherein the local network comprises a WiMax network.

8. A communication system as recited in claim 1 wherein the local network comprises a cellular network.

9. A method of operating a communication system comprising:
   wirelessly communicating a first portion of a selection list to a wireless mobile receiving device from a local controller, said first portion corresponding to content available from the local controller;
   wirelessly communicating a second portion of the selection list to the wireless mobile receiving device from a business controller, said second portion corresponding to content available from the local controller;
   selecting from the selection list;
   generating a selection signal in response to selecting;
   wirelessly transmitting the selection signal to the local controller;
   wirelessly transmitting content from the local controller when the selection signal corresponds to the first portion;
   transmitting the selection signal to the business controller when the selection signal corresponds to the second portion;
   communicating content directly to the mobile receiving device outside of the local network from the business controller; and
   receiving the content at the mobile receiving device.

10. A method as recited in claim 9 wherein wirelessly communicating a second portion of a selection list to a wireless mobile receiving device comprises wirelessly communicating the second portion of the selection list to the wireless mobile receiving device from the business controller through a satellite.

11. A method as recited in claim 9 further comprising storing the content on the mobile receiving device.

12. A method as recited in claim 9 wherein wirelessly transmitting content from the local controller comprises streaming the content.

13. A method as recited in claim 9 wherein the mobile receiving device comprises a mobile satellite receiver.

14. A method as recited in claim 9 wherein wirelessly communicating a first portion of a selection list to a wireless mobile device comprises wirelessly communicating the first portion of the selection list to the wireless mobile device through a WiFi network.

15. A method as recited in claim 9 wherein wirelessly communicating a first portion of a selection list to a wireless mobile device comprises wirelessly communicating the first portion of the selection list to the wireless mobile device through a WiMax network.

16. A method as recited in claim 9 wherein wirelessly communicating a first portion of a selection list to a wireless mobile device comprises wirelessly communicating the first portion of the selection list to the wireless mobile device through a cellular network.

17. A method as recited in claim 9 wherein wirelessly transmitting a selection signal comprises a wirelessly transmitting the selection signal through a WiFi network.

18. A method as recited in claim 9 wherein wirelessly transmitting a selection signal comprises wirelessly transmitting the selection signal through a WiMax network.

19. A method as recited in claim 9 wherein wirelessly transmitting a selection signal comprises a wirelessly transmitting the selection signal through a cellular network.

20. A method of operating a mobile receiving device comprising:
   receiving a first portion of a selection list of content from a local controller, said first portion corresponding to content available from the local controller;
   receiving a second portion of the selection list of content from a business controller, said second portion corresponding to content available from the business controller;
   selecting a selection from the selection list at the mobile receiving device;
   wirelessly transmitting the selection to the local controller from the mobile receiving device;
   when the selection corresponds to the second portion communicating the selection from the local controller to the business controller;
   receiving content corresponding to the selection at the mobile receiving device when the selection corresponds to the first portion;
   receiving content directly outside of the local network from the business controller when the selection corresponds to the second portion; and
   playing back the content using the mobile receiving device.

21. A method as recited in claim 20 further comprising storing the content on the mobile receiving device.

22. A method as recited in claim 20 wherein playing back the content comprises streaming the content.

23. A method as recited in claim 20 wherein the mobile receiving device comprises a mobile satellite receiver.

24. A method as recited in claim 20 wherein receiving a second portion of a selection list comprises receiving a second portion of the selection list through a satellite.

25. A method as recited in claim 20 wherein receiving a first portion of a selection list comprises a receiving the first portion of the selection list through a WiFi network.

26. A method as recited in claim 20 wherein receiving a first portion of a selection list comprises a receiving the first portion of the selection list through a cellular network.

27. A method as recited in claim 20 wherein wirelessly transmitting the selection comprises wirelessly transmitting the selection through a WiFi network.

28. A method as recited in claim 20 wherein wirelessly transmitting the selection comprises wirelessly transmitting the selection through a cellular network.

29. A method as recited in claim 20 wherein receiving content comprises receiving content through a stratospheric platform.

* * * * *